(12) United States Patent
Pontone et al.

(10) Patent No.: US 12,090,719 B2
(45) Date of Patent: Sep. 17, 2024

(54) METHOD AND SYSTEM FOR APPLYING A SEALING AGENT TO THE SURFACE OF AN INTERNAL CAVITY OF A PNEUMATIC TIRE

(71) Applicant: BRIDGESTONE EUROPE NVSA [BE/BE], Zaventem (BE)

(72) Inventors: Roberto Pontone, Rome (IT); Paolo Straffi, Rome (IT)

(73) Assignee: Bridgestone Europe NV/SA, Zaventem (BE)

( * ) Notice: Subject to any disclaimer, the term of this patent is extended or adjusted under 35 U.S.C. 154(b) by 203 days.

(21) Appl. No.: 17/914,459

(22) PCT Filed: Mar. 26, 2021

(86) PCT No.: PCT/EP2021/058027
§ 371 (c)(1),
(2) Date: Sep. 26, 2022

(87) PCT Pub. No.: WO2021/198108
PCT Pub. Date: Oct. 7, 2021

(65) Prior Publication Data
US 2023/0347610 A1 Nov. 2, 2023

(30) Foreign Application Priority Data

Mar. 30, 2020 (IT) .................. 102020000006637

(51) Int. Cl.
*B29D 30/06* (2006.01)
*B29C 73/16* (2006.01)
*B29D 30/00* (2006.01)

(52) U.S. Cl.
CPC ........ *B29D 30/0685* (2013.01); *B29C 73/166* (2013.01); *B29D 2030/0066* (2013.01); (Continued)

(58) Field of Classification Search
CPC .... B29D 2030/0066; B29D 2030/0635; B29D 2030/0694; B29D 2030/0698; B29D 30/0685
See application file for complete search history.

(56) References Cited

U.S. PATENT DOCUMENTS 4,115,172 A * 9/1978 Baboff ............... B29D 30/0685
118/318
2015/0107743 A1 4/2015 Seong

FOREIGN PATENT DOCUMENTS

CN 102294834 A 12/2011
CN 208558366 U 3/2019
(Continued)

OTHER PUBLICATIONS

English machine translation of JP2001018609 (Year: 2001).*
(Continued)

*Primary Examiner* — Scott W Dodds
(74) *Attorney, Agent, or Firm* — Patterson Intellectual Property Law, PC

(57) ABSTRACT

A method and system for applying a sealing agent to a surface (2) of an inner cavity (3) of a pneumatic tyre; the method provides for detecting the weight of the pneumatic tyre (4) before and after the application of the sealing agent to the surface (2); calculating the difference between the quantity of sealing agent applied to the surface (2) and a reference quantity of sealing agent, storing said difference within a short-term memory buffer (24) and a long-term memory buffer (26); determining a short-term compensation factor ($K_{ST}$) and a long-term compensation factor ($K_{LT}$) and calculating a correction factor ($K_{EA}$) using alternately the short-term compensation factor ($K_{ST}$) or else the long-term compensation factor ($K_{LT}$); and using said correction factor ($K_{EA}$) to actuate an applicator device (7) during the subse- (Continued)

quent step of applying the strip of sealing agent to the surface (2).

12 Claims, 3 Drawing Sheets

(52) U.S. Cl.
CPC ............... *B29D 2030/069* (2013.01); *B29D 2030/0694* (2013.01); *B29D 2030/0698* (2013.01)

(56) References Cited

FOREIGN PATENT DOCUMENTS

| EP | 3009260 A1 | 4/2016 | |
|---|---|---|---|
| JP | 2001018609 A | 1/2001 | |
| WO | WO-2016105410 A1 * | 6/2016 | ......... B29D 30/0633 |

OTHER PUBLICATIONS

International Search Authority: European Patent Office International Search Report for corresponding International Patent Application No. PCT/EP2021/058027 dated Jun. 10, 2021.

\* cited by examiner

METHOD AND SYSTEM FOR APPLYING A SEALING AGENT TO THE SURFACE OF AN INTERNAL CAVITY OF A PNEUMATIC TIRE

TECHNICAL SECTOR

The present invention relates to a method and a system for applying a sealing agent to the surface of an internal cavity of a pneumatic tire.

PRIOR ART

As is known, a pneumatic tire comprises a toroidal carcass, which has two annular beads and supports an annular tread. Between the casing and the tread, a tread belt is interposed, which comprises a number of tread plies. Within the body ply, an inner liner is arranged which is airtight, constitutes an inner lining and has the function of retaining the air within the pneumatic tire in order to maintain the inflation pressure of the pneumatic tire itself over time.

In recent years pneumatic tire development has been directed towards pneumatic tires with an inner lining that is manufactured with a sealing agent that is intended to seal any punctures. Typically, the sealing agent has a high viscosity in order to ensure both the sealing action in relation to any punctures and the stability thereof within the inner cavity regardless of the conditions of the pneumatic tire.

The sealing agent is applied to a pre-vulcanized pneumatic tire and preferably to the inner liner within the area of the pneumatic tire that comes into contact with the road (or the area of the pneumatic tire wherein punctures can potentially occur). In particular, the sealing agent is applied at the tread and at least partially at the sidewalls.

Typically, the process for applying the sealing agent provides for the positioning of the pre-vulcanized pneumatic tire on a frame whereupon it is blocked by means of lateral rails in such a way as to prevent any lateral translation of the pneumatic tire itself.

In response to an operator command, the sealing agent application process is started by inserting a sealing agent applicator device into the internal cavity of the pneumatic tire in a position directly facing a surface of the internal cavity itself. The applicator device is conveniently implemented by means of a movable arm provided at one end of a nozzle and is intended to apply a substantially uniform bead of sealing agent to the inner surface of the cavity. In particular, the applicator device is intended to apply a bead of sealing agent by means of a reciprocating movement between the two lateral ends of the internal cavity; in particular, the arm moves within a plane that is perpendicular to the equatorial plane of the pneumatic tire. The pneumatic tire is brought into rotation by the support by means of motorized rollers; the movement (continuous or alternatively stepped) of the arm, combined with the rotation of the pneumatic tire, results in the application of the sealing agent, which must be as uniform as possible. The sealing agent has, in fact, a high specific weight, and even a small change in the amount of sealing agent applied to the inner surface of the pneumatic tire can cause a significant variation in the weight of the pneumatic tire, leading to an imbalance (i.e., an eccentricity) of the overall mass of the pneumatic tire. It has been observed that known, and currently used, application systems do not make it possible to obtain elevated uniformity in relation to the thickness of the sealing agent that is applied to the surface of the internal cavity, i.e., the thickness of the sealing agent that is applied to the surface of the internal cavity can present appreciable variations from area to area.

DESCRIPTION OF THE INVENTION

The object of the present invention is therefore to provide a method for applying a sealing agent to the surface of an internal cavity of a pneumatic tire that is free from the disadvantages of the state of the art and that is, in particular, easy and inexpensive to implement.

A further object of the present invention is accordingly to provide a system for applying a sealing agent to the surface of an internal cavity of a pneumatic tire that is free from the disadvantages of the state of the art and that is, in particular, easy and inexpensive to manufacture.

According to the present invention a method and a system are provided for applying a sealing agent to the surface of an internal cavity of a pneumatic tire according to what is determined within the attached claims.

BRIEF DESCRIPTION OF THE DRAWINGS

The present invention is now described with reference to the attached drawings, which illustrate several non-limiting exemplary embodiments, wherein.

PREFERRED EMBODIMENTS OF THE INVENTION

Figure 1:
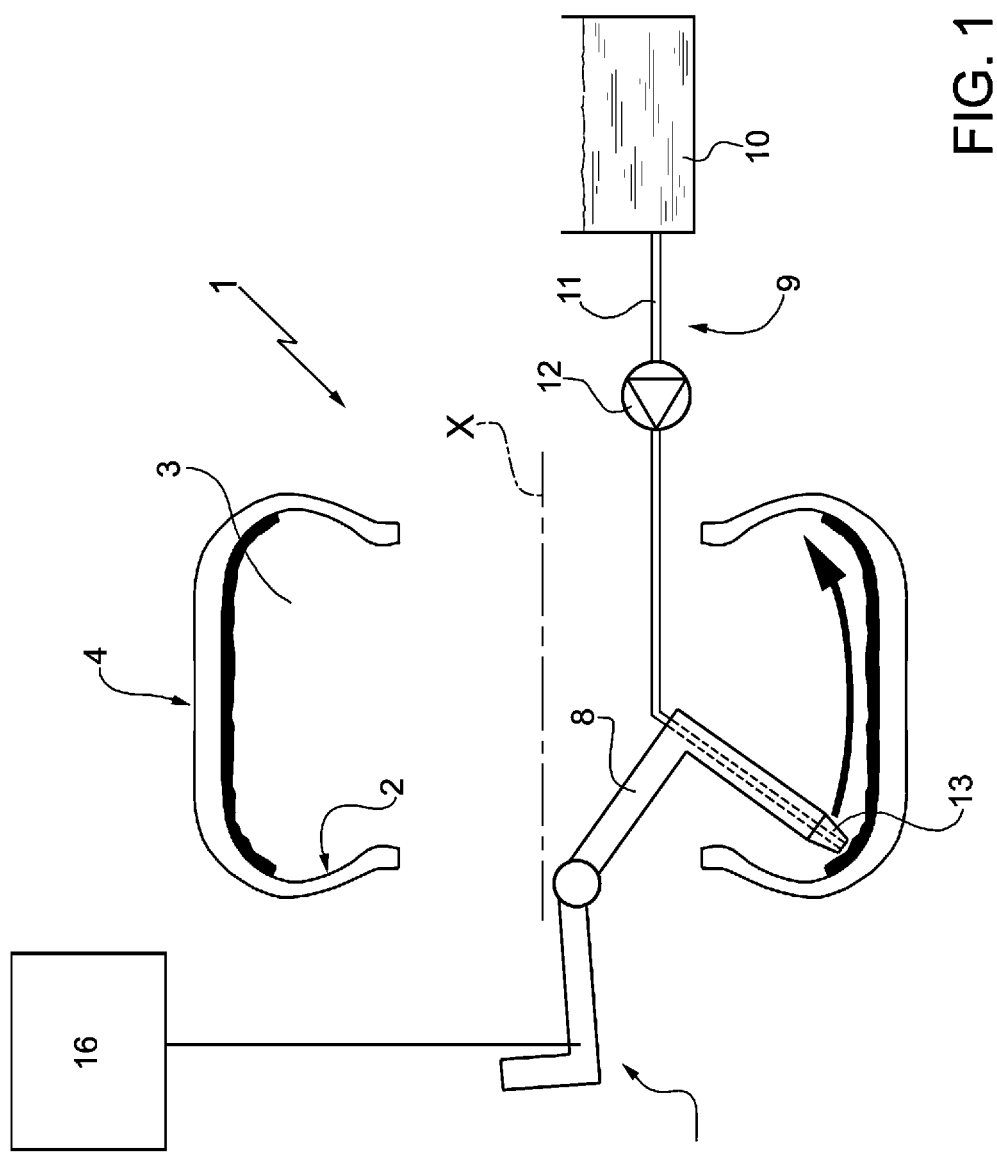
FIG. 1 is a schematic front view, with parts removed for clarity, of a system that has been implemented for the application of a sealing agent to the surface of the internal cavity of a pneumatic tire.
Figure 2:
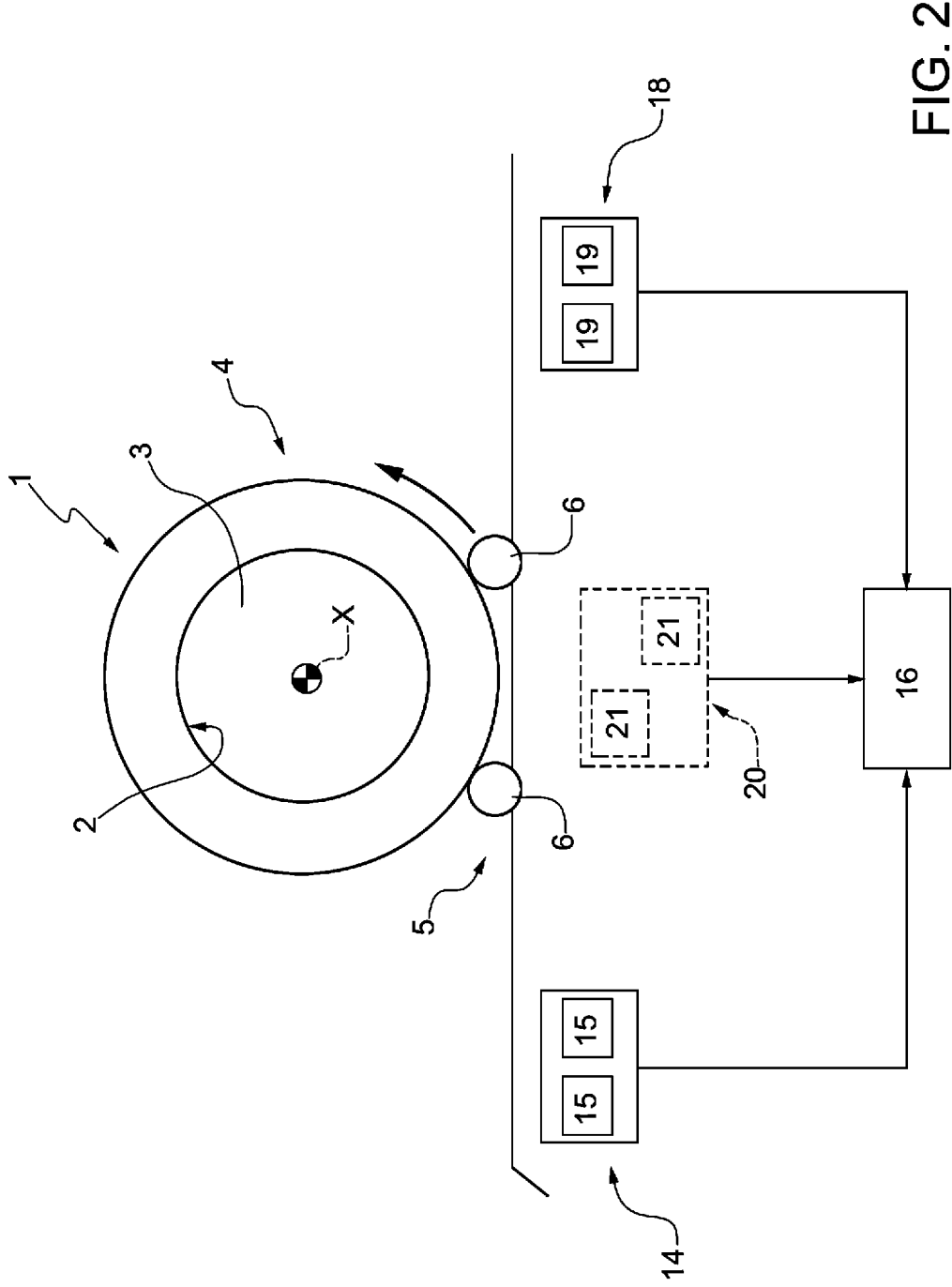
FIG. 2 is a schematic view, with parts removed for clarity, of the system of FIG. 1.

With reference to FIG. 1, the numeral 1 denotes a system 1 in its entirety for the application of a sealing agent to the surface 2 of an internal cavity 2 of a pneumatic tire 4. It is to be understood that the phrase "profile of the internal cavity 3 of a pneumatic tire 4", refers to a surface profile of the pneumatic tire 4.

The pneumatic tire 4 is arranged on a frame 5 that is suitable for supporting, and bringing into rotation around a central X axis thereof, the pneumatic tire 4 by means of motorized rollers 6. The frame 5 is designed to bring pneumatic tires 3 into rotation at a substantially constant speed and preferably between 1 and 15 m/min. Preferably, the pneumatic tire 4 is housed within the frame 5 in such a way as to prevent any lateral translation of the pneumatic tire 4 itself during the rotational movement around the x axis.

As shown in FIG. 1, the system 1 comprises a sealing agent applicator device 7, which is conveniently implemented by means of a robot with an arm 8 that is movable and intended to apply a substantially uniform bead of sealing agent to the surface 2.

The applicator device 7 is intended to apply a bead of sealing agent by means of a reciprocating movement between the two lateral ends of the internal cavity 3; in particular, the arm 8 moves in a plane that is substantially orthogonal to the equatorial plane of the pneumatic tire 4. The rotation of the frame 5 around the axis X and the movement of the arm 8 results in an application with a helical progression. More specifically, the applicator device 7 is intended to apply a bead of sealing agent at the portion of the pneumatic tire 3 that is intended to come into contact with the road, i.e., at the tread and, at least partially, at the sidewalls.

The applicator device 7 is connected to a sealing agent supply circuit 9 comprising a tank 10 that is preferably manufactured from a metallic material and contains the sealing agent, a conduit 11 that is preferably heated and that originates from the tank 10 and that is in hydraulic communication with the applicator device 7, and a pumping device 12 that extracts the sealing agent from the tank 10 and supplies it under pressure to the applicator device 7.

According to a preferred variant, the applicator device 7 is implemented by means of a nozzle 13 in order to perform the non-contact application of the sealing agent in the semifluid state; the nozzle 13 is preferably arranged at one axial end of the movable arm 8.

The applicator device 7 is implemented in such a way as to make the distance between the nozzle 18 and the surface 5 substantially constant. It should be emphasized that by holding the distance between the nozzle 18 and the surface 5 substantially constant it is possible to implement a more uniform application in terms of the thickness and width of the bead and in terms of the precision of the sealing agent application area.

According to a first embodiment, provided upstream of the frame 5 is a weighing station 14, which includes a number of load cells 15, wherein each thereof comprises a known type of measuring device connected to a control unit 16, which in turn comprises a signal processing device 17. The signal processing device 17 is configured in such a way as to receive, before the application of the sealing agent, signals from the load cells 15 that are indicative of the weight of the pneumatic tire 4.

Provided upstream of the frame 5 is a further weighing station 18, which in turn comprises a number of load cells 19, wherein each thereof comprises a known type of measuring device connected to the control unit 16. The signal processing device 17 is configured in such a way as to receive, after the application of the sealing agent, signals from the load cells 19 that are indicative of the weight of the pneumatic tire 4.

According to a second embodiment, corresponding to the position of the frame 5, a weighing station 20 is provided, which comprises a number of load cells 21, wherein each thereof comprises a known type of measuring device connected to the control unit 16. The signal processing device 17 is configured in such a way as to receive signals from the load cells 21 that are indicative both of the weight of the pneumatic tire 4 before the application of the sealant and the signals that are indicative of the weight of the tire 4 after the application of the sealing agent.

In both embodiments, the signal processing device 17 is therefore implemented in such a way as to calculate the quantity of sealing agent applied from the difference between the weight of the pneumatic tire 4 after the application of the sealing agent and the weight of the pneumatic tire 4 before the application of the sealing agent.

The data in relation to the quantity of sealing agent applied for each pneumatic tire 4 (calculated from the difference between the weight of each pneumatic tire 4 after the application of the sealing agent and the weight of the same pneumatic tire 4 before the application of the sealing agent) are stored within a one-dimensional array 22 or short-term vector within a memory buffer 23 within the control unit 16. The short-term vector 22 defines a short-term memory buffer 24.

It is important to highlight that the quantity of sealing agent to be applied is variable as a function of the reference features (in particular as a function of the dimensions/size) of the pneumatic tire 4. According to a first variant, a plurality of short-term vectors 22 is stored within the short-term memory buffer 24, wherein each short-term vector 22 corresponds to a different type of pneumatic tire 4 whereupon the layer of sealing agent being processed by the system 1 can be applied.

According to a second and preferred variant, the data in relation to all of the different types of pneumatic tire 4 to which the layer of sealing agent being processed by the system 1 can be applied, are stored within a single short-term vector 22 within the short-term memory buffer 24. The reference quantities of sealing agent to be applied for each of the different types of pneumatic tire 4 being processed by the system 1 are stored within the control unit 16. The reference quantities of sealing agent to be applied for each of the different types of pneumatic tire 4 are preferably determined during an experimental fine-tuning step of the system 1 as a function of the reference characteristics (in particular as a function of the dimensions/size) of each of the different types of pneumatic tire 4. Preferably, the reference quantities of sealing agent to be applied for each of the different types of pneumatic tire 4 being processed by the system 1 are fixed and are not modified during the operation of the system 1.

Once the type of pneumatic tire 4 to be processed has been selected, the control unit 16 is configured to compare the quantity of sealing agent applied to each pneumatic tire 4 with the respective reference quantity. In particular, the control unit 16 is configured to calculate the difference between the quantity of sealing agent applied for each pneumatic tire 4 and the respective reference quantity. The differences between the quantity of sealing agent applied to each pneumatic tire 4 and the respective reference quantity are stored within the short-term vector 22. It appears evident that in this way the data contained within the short-term vector 22 are independent of the reference characteristics (in particular as a function of the dimensions/size) of the pneumatic tire 4 and data relating to different types of pneumatic tires 4 can be stored. The control unit 16 is therefore able to assess both the direction/orientation of the deviation in relation to the reference quantity of sealing agent to be applied (i.e., if, compared to the reference quantity of sealing agent to be applied, the tendency is to apply a greater or lesser quantity of sealing agent) and the absolute value of the deviation in relation to the reference quantity of sealing agent to be applied (i.e., by how much the quantity of sealing agent to be applied deviates from the reference quantity of sealing agent to be applied).

The short-term vector 22 comprises a number of cells between 80 and 120, preferably between 95 and 105, in particular equal to 100. The short-term vector 22 is preferably handled using FIFO logic (first in first out).

Similarly, the data in relation to the quantity of sealing agent applied for each pneumatic tire 4 (calculated from the difference between the weight of each pneumatic tire 4 after the application of the sealing agent and the weight of the same pneumatic tire 4 before the application of the sealing agent) are stored within a one-dimensional array 25 or long-term vector within the memory buffer 23. The long-term vector 25 defines a long-term memory buffer 26.

According to a first variant, a plurality of long-term vectors 25 is stored within the long-term memory buffer 26, wherein each long-term vector 22 corresponds to a different type of pneumatic tire 4 whereupon the layer of sealing agent being processed by the system 1 can be applied.

According to a second and preferred variant, the data in relation to all of the different types of pneumatic tire 4 to which the layer of sealing agent being processed by the system 1 can be applied, are stored with a single long-term vector 25 within the long-memory buffer 26. The reference quantities of sealing agent to be applied for each of the different types of pneumatic tire 4 being processed by the system 1 are stored within the control unit 16. The reference quantities of sealing agent to be applied for each of the different types of pneumatic tire 4 are preferably determined during an experimental fine-tuning step of the system 1 as a function of the reference characteristics (in particular as a function of the dimensions/size) of each of the different types of pneumatic tire 4. Preferably, the reference quantities of sealing agent to be applied for each of the different types of pneumatic tire 4 being processed by the system 1 are fixed and are not modified during the operation of the system 1.

Once the type of pneumatic tire 4 to be processed has been selected, the control unit 16 is configured to compare the quantity of sealing agent applied to each pneumatic tire 4 with the respective reference quantity. In particular, the control unit 16 is configured to calculate the difference between the quantity of sealing agent applied for each pneumatic tire 4 and the respective reference quantity. The differences between the quantity of sealing agent applied to each pneumatic tire 4 and the respective reference quantity are stored within the long-term vector 25. It appears evident that in this way the data contained within the long-term vector 25 are independent of the reference characteristics (in particular as a function of the dimensions/size) of the pneumatic tire 4, and data relating to different types of pneumatic tires 4 can be stored. The control unit 16 is therefore able to assess both the direction/orientation of the deviation in relation to the reference quantity of sealing agent to be applied (i.e., if, compared to the reference quantity of sealing agent to be applied, the tendency is to apply a greater or lesser quantity of sealing agent) and the absolute value of the deviation in relation to the reference quantity of sealing agent to be applied (i.e., by how much the quantity of sealing agent to be applied deviates from the reference quantity of sealing agent to be applied).

The long-term vector 25 comprises a number of cells of between 450 and 500, preferably between 480 and 520, in particular equal to 500. The long-term vector 25 is preferably handled using FIFO logic (first in first out).

Finally, the data in relation to the quantity of sealing agent applied for each pneumatic tire 4 (calculated from the difference between the weight of each pneumatic tire after the application of the sealing agent and the weight of the same pneumatic tire before the application of the sealing agent) are stored within a one-dimensional array 27 or historical memory vector within the memory buffer 23. The historical memory vector 27 defines a historical memory buffer 28. The historical memory buffer 28 collects the production data of approximately 500,000 pneumatic tires. In addition to the data in relation to the quantity of applied sealing agent, for each pneumatic tire 4, within the historical memory buffer 28, additional production data are also stored such as, for example, the time of year wherein the production of the pneumatic tire 4 occurred, the type of nozzle 13 used for the production of the pneumatic tire 4, etc.

Figure 3:
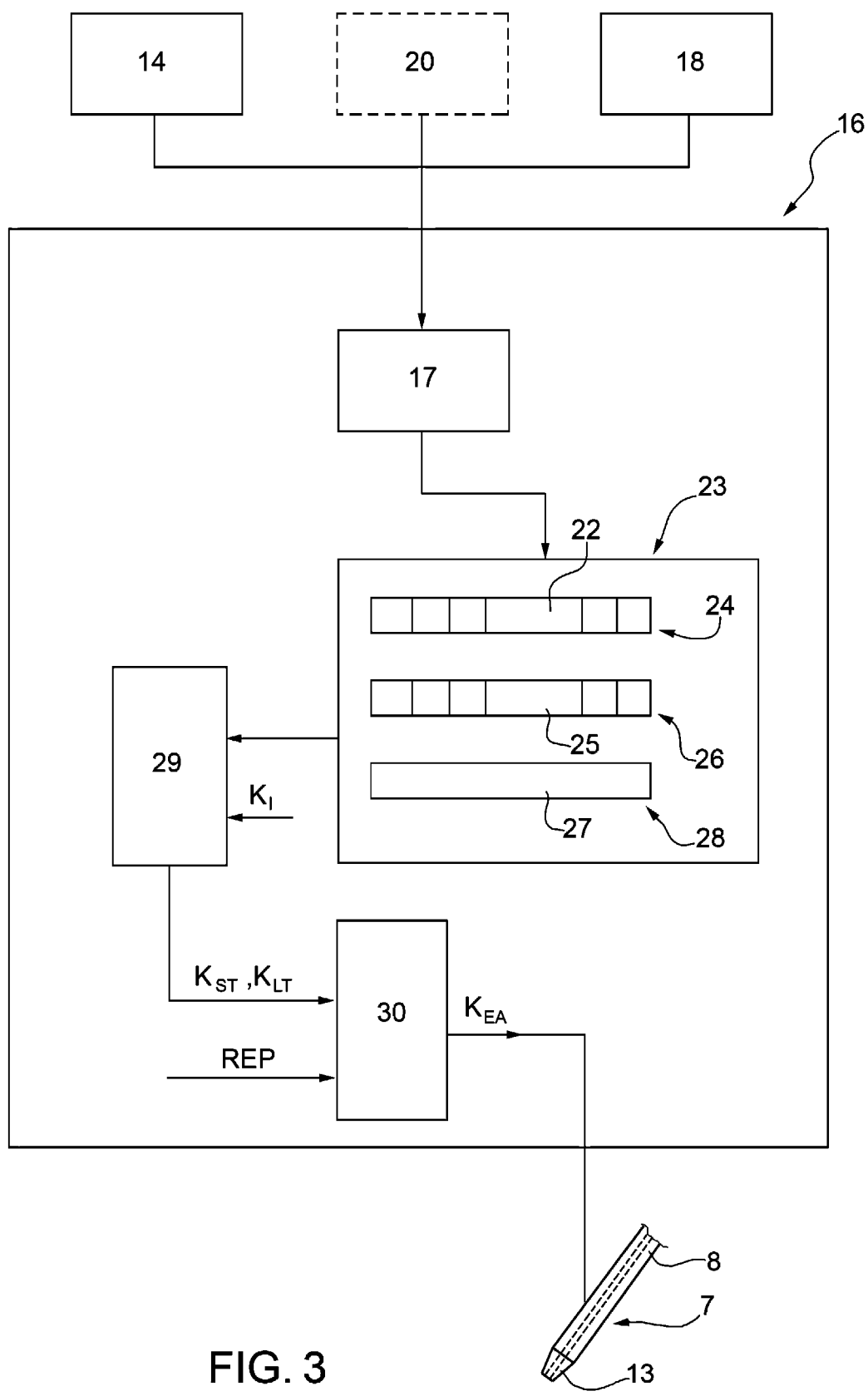
FIG. 3 shows schematically a control unit for the system of FIG. 1, which implements the method for applying a sealing agent to the surface of an internal cavity of a pneumatic tire arranged in accordance with the present invention.

As shown in FIG. 3, a predictive algorithm 29 is stored within the control unit 16 that receives at the input, inter alia, the data provided by the short-term memory buffer 24, by the long-term memory buffer 26 and by the historical memory buffer 28.

In particular, the predictive algorithm 29 receives the following input data:
(a) the average value of the quantity of sealing agent stored within the short-term memory buffer 24;
(b) the direction/orientation of the quantity of sealing agent stored within the short-term memory buffer 24 (i.e., if, compared to the reference quantity of sealing agent to be applied, the tendency is to apply a greater or lesser quantity of sealing agent);
(c) the average value of the quantities of sealing agent stored within the long-term memory buffer 26;
(d) the direction/orientation of the quantities of sealing agent stored within the long-term memory buffer 26 (i.e., if, compared to the reference quantity of sealing agent to be applied, the tendency is to apply a greater or lesser quantity of sealing agent);
(e) production data supplied by the historical memory buffer 28;
(f) the amount of time that the applicator device 7 is inoperative (i.e., the amount of time that the applicator device 7 has remained stationary; it has been experimentally verified that the stationary nature of the sealing agent within the supply circuit 9 negatively influences the characteristics, in particular the density, of the sealing agent);
(g) for the historical data in relation to the sealing agent (the sealing agent is kept in barrels that can be produced even 1-3 months before being applied; clearly, the amount of time that elapses, from production to application on the pneumatic tire 4, adversely affects the characteristics, in particular the density of the sealing agent).

On the basis of all of the input data received, the predictive algorithm 29 produces a short-term compensation factor $K_{ST}$ and a long-term compensation factor $K_{LT}$.

The predictive algorithm 29 consists in a mathematical model wherein the different previously processed input data are used to calculate the short-term compensation factor $K_{ST}$ and the long-term compensation factor $K_{LT}$.

The short-term compensation factor $K_{ST}$ and the long-term compensation factor $K_{LT}$ are determined as follows:

$$K_{ST}, K_{LT} = k_1*(a) + k_2*(b) + \ldots + k_7*(g)$$

wherein (a)-(g) represent the different input data input and $k_i$ (with i=1, 2, ... 7) represent the weights attributed to each input datum.

The weights $k_i$ are not constant but depend upon the compensation factor that is being calculated, distinguishing between short-term compensation factor $K_{ST}$ and the $K_{LT}$ compensation factor. In the case wherein the short-term compensation factor $K_{ST}$ is being calculated, a weight is attributed that is greater that the data (a) and (b) taken from the short-term memory buffer 24; whilst, in contrast, in the case wherein the long-term compensation factor $K_{LT}$ is being calculated, a weight is attributed that is greater than the data (c) and (d) taken from the long-term memory buffer 26.

Finally, the control unit 16 comprises a module 30 for calculating the compensation parameters that it receives at the input from the predictive algorithm 29, both the short-term compensation factor $K_{ST}$ and the long-term compensation factor $K_{LT}$, together with further production data (generically indicated with REP, "recipe extrusion parameters") such as, for example, the dimensions of the pneumatic tire 4 being processed, the type of nozzle 13, the extrusion speed, etc.

Based on the short-term compensation factor $K_{ST}$ or the long-term compensation factor $K_{LT}$, provided by the predictive algorithm 29, and on the REP production data, the calculation module 30 produces an extrusion process correction factor $K_{EA}$.

The calculation module 30 consists of a mathematical model for calculating the correction factor $K_{EA}$. In particular, the correction factor $K_{EA}$ is determined as follows:

$$K_{EA}=p_1 *K_{ST}/K_{LT}+p_2 *REP$$

wherein $K_{ST}/K_{LT}$ and REP have the meanings introduced previously and $p_i$ (with i=1, 2) represent the weights attributed respectively to the short-term compensation factor $K_{ST}$ or else to the long-term compensation factor $K_{LT}$ and to the REP production data. The weights $p_i$ are preferably constant.

The short-term compensation factor $K_{ST}$ and the long-term compensation factor $K_{LT}$ from predictive algorithm 29 are not used simultaneously but exclusively within the formula to determine the correction factor $K_{EA}$.

During the normal production process, the short-term compensation factor $K_{ST}$ is used within the formula to determine the correction factor $K_{EA}$. In contrast, the long-term compensation factor $K_{LT}$ is used within the formula to determine the correction factor $K_{EA}$ in the case wherein the system 1 is, for example, restarted after a production shutdown period.

Hereinafter there will be described the method of operation of the system 1, which includes, in succession, the following steps:

an operator or, alternatively, an automatic manipulator arranges the pneumatic tire 4 on the support 5 and blocks it by means of side rails in such a way as to prevent any lateral translation of the pneumatic tire 3 itself;

at the weighing station 18, the weight is measured of the pneumatic tire 4 before the application of the sealing agent;

the applicator device 7 is inserted into the internal cavity 3;

the nozzle 13 is arranged at an initial position in order to initiate the application of the sealing agent;

the pneumatic tire 4 is brought into rotation around the X axis by the frame whilst the nozzle 13 initiates the application of the sealing agent;

during the rotation of the pneumatic tire 4 around the axis X, the nozzle 13 moves in such a way as to keep the distance between the nozzle 13 and the surface 5 substantially constant in order to implement a more uniform application to the surface 2;

at the end of the step of applying the sealing agent to the surface 2, at the weighing station 20 the weight of the pneumatic tire 4 is measured at the end of the application of the sealing agent;

the frame 5 is stopped such that the applicator device 7 can be extracted from the inner cavity 3 and the pneumatic tire 4 can be extracted from the frame 5;

and the data recorded at the weighing stations 18, 20 are transmitted to the control unit 16 in order to determine the correction factor $K_{EA}$ according to the method described within the preceding discussion.

The advantages of the system 1 described in the preceding discussion are evident.

In particular, the determination of the correction factor $K_{EA}$ makes it possible to implement a very uniform and constant application of the sealing agent onto the surface 2, insofar as it makes it possible to take into account the variations generated by the extrusion process and by the oscillations of the flow of sealing agent within the supply circuit 9.

The invention claimed is:

1. A method for applying a sealing agent to a surface of an inner cavity of a pneumatic tire, the method comprising:
    applying a strip of sealing agent to the surface of the inner cavity via an applicator device while the pneumatic tire is brought into rotation around an axis thereof;
    measuring a first weight of the pneumatic tire before the application of the sealing agent to the surface;
    measuring a second weight of the pneumatic tire after the application of the sealing agent to the surface;
    calculating a quantity of sealing agent applied to the surface from a difference between the measured second weight and the measured first weight;
    calculating a difference between the quantity of sealing agent applied to the surface and a reference quantity of sealing agent to be applied to the surface that varies as a function of a type of pneumatic tire;
    storing said difference between the quantity of sealing agent applied to the surface and the reference quantity within a short-term memory buffer and a long-term memory buffer having a greater number of cells than the short-term memory buffer;
    determining a short-term compensation factor and a long-term compensation factor as a function of both the short-term memory buffer and the long-term memory buffer;
    calculating a correction factor selectively using the short-term compensation factor or the long-term compensation factor; and
    using said correction factor to actuate the applicator device during a subsequent iteration of applying the strip of sealing agent to the surface.

2. The method of claim 1, wherein said correction factor is calculated as a function of the short-term compensation factor, or alternatively of the long-term compensation factor, and of production data including dimensions of the pneumatic tire being processed, a type of nozzle of the applicator device, and an extrusion speed.

3. The method of claim 1, further comprising: storing said quantity of sealing agent applied within a historical memory buffer comprising production data for a plurality of pneumatic tires; and determining the short-term compensation factor and the long-term compensation factor as a function of the historical memory buffer.

4. The method of claim 1, wherein the short-term memory buffer is defined by a first vector having a number of cells of between 80 and 120.

5. The method of claim 1, wherein the short-term memory buffer is defined by a first vector having a number of cells of between 95 and 105, and handled using first in first out (FIFO) logic.

6. The method of claim 1, wherein the long-term memory buffer is defined by a second vector having a number of cells of between 450 and 550.

7. The method of claim 1, wherein the long-term memory buffer is defined by a second vector having a number of cells of between 480 and 520, and handled using first in first out (FIFO) logic.

8. The method of claim 1, comprising: determining the short-term compensation factor and the long-term compensation factor via a mathematical model as a function of a plurality of input data obtained from at least the short-term memory buffer and from the long-term memory buffer, and of a plurality of weights assigned to said input data; wherein the weights vary as a function of the short/long-term compensation factor being calculated.

9. The method of claim 8, wherein the input data comprise:
   an average value of the quantities of sealing agent stored within the short-term memory buffer and within the long-term memory buffer; and
   a tendency to apply a greater or lesser quantity of sealing agent within the short-term memory buffer and within the long-term memory buffer.

10. The method of claim 8, the input data comprise production data for a plurality of pneumatic tires provided by a historical memory buffer.

11. The method of claim 8, wherein the input data comprise a length time of time that the applicator device is inoperative.

12. The method of claim 8, wherein the input data comprise historical data in relation to the sealing agent.

* * * * *